Dec. 13, 1966 D. L. CARSON 3,292,142
HIGH PRESSURE TRANSDUCER CALIBRATION AND TEST EQUIPMENT
Filed March 11, 1965
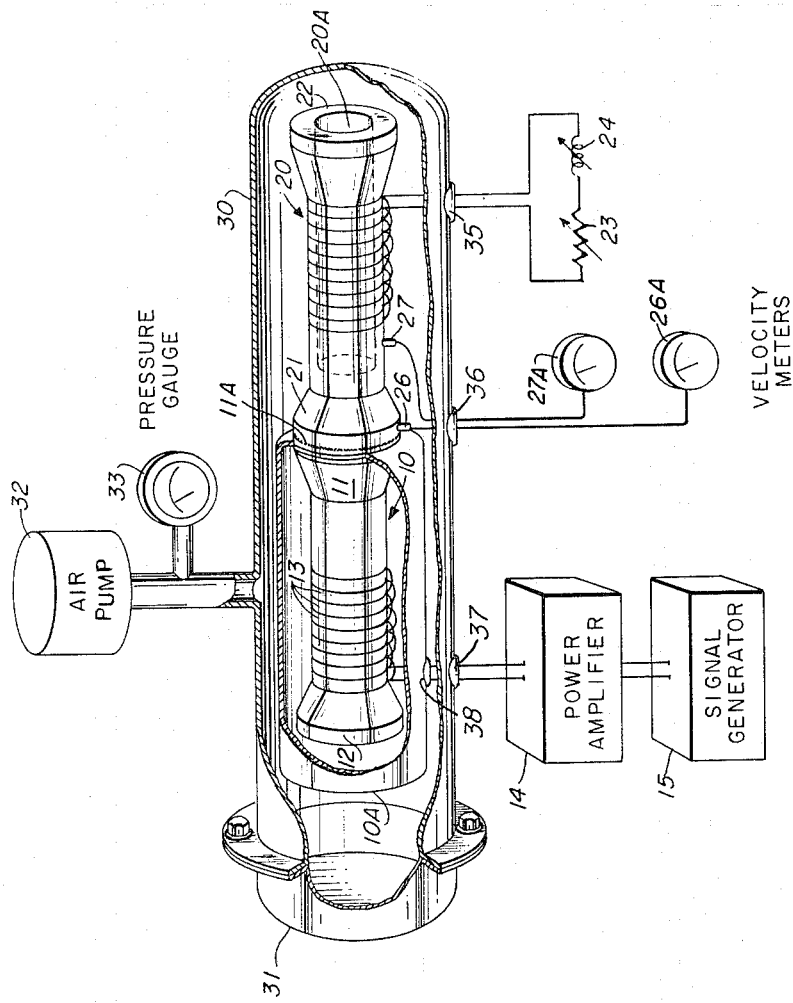
INVENTOR.
DAVID L. CARSON
BY
ATTORNEYS

United States Patent Office 3,292,142
Patented Dec. 13, 1966

3,292,142
HIGH PRESSURE TRANSDUCER CALIBRATION
AND TEST EQUIPMENT
David L. Carson, San Diego, Calif., assignor to the United States of America as represented by the Secretary of the Navy
Filed Mar. 11, 1965, Ser. No. 439,111
3 Claims. (Cl. 340—8)

The invention described herein may be manufactured and used by or for the Government of the United States of America for governmental purposes without the payment of any royalties thereon or therefor.

This invention relates to methods and means for testing transducers and is particularly directed to means for simulating, in the laboratory, deep submergence conditions during testing.

The transducer treated here is a device for ensonifying an ocean volume in response to an electrical driven oscillatory prime mover. Underwater testing of such devices has heretofore left much to be desired largely because all controls must be remote with respect to the submerged transducer. Bench testing has been considered impossible because the transducer to operate properly must be coupled to water, not air. Submersibles adapted for depths of the order of thousands of feet are now considered. Cables of that length for recording transducer characteristics are, of course, impractical.

The object of this invention is to provide improved methods and means for testing transducers.

A more specific object of this invention is to provide means for simulating submergence of any depth in the laboratory while testing a transducer.

The test equipment of this invention comprises a load transducer capable of generating an output signal at the electrical terminals of the transducer which is a function of oscillatory mechanical power applied to the face of the load transducer from an operating transducer under test. The transducer under test is placed face-to-face with the load transducer and is joined airtightly. The two face-to-face transducers with an airtight interface is placed in a pressure container, the atmosphere of which can be elevated to any desired hydrostatic pressure. Through pressure seals, the terminals of the transducer under test is connected to a signal source and the terminals of the load transducer is connected to a reactive load. The velocity of the interface of the transducers is measured by an accelerometer through a second lead-in. As more fully described in co-pending application of Hickman and Martin, Serial No. 438,431, filed March 9, 1965, and assigned to the assignee of this application, the radiation impedance of the test transducer is accurately determined by the velocity of the radiating face and the reactance of the load. Since the face-to-face contact of the two transducers is under the hydrostatic pressure of the container, the transducer under test responds as though it is submerged. The effects of pressure is shown in the radiation impedance readings.

Other objects and features of this invention will become apparent to those skilled in the art by referring to specific embodiments described in the following specification and shown in the accompanying drawing in which the single figure shows in section the test equipment of this invention.

The particular transducer 10 to be tested comprises the head piece 11 and the tail piece 12 joined at either end of the stack of electro-ceramic discs or rings 13. Alternate metallic interfaces of the ceramic rings are joined together and are connected through lead-in wires to the power amplifier 14 driven by the signal generator 15. Ideally, the reciprocations of the head piece 11 follows the waveforms of the applied signal. Case 10A encloses the transducer 10 and is joined in an airtight junction with the periphery of the head piece 11 so that only the radiating face of the head piece is exposed. The head piece 11 is mechanically loaded by the load transducer 20 which, preferably, comprises a transducer similar in construction to the test transducer. The transducer 20 includes the head piece 21 and the tail piece 22. The back side of the head piece is vented, as by passage 20A to permit "flooding" of the entire structure. The faces of the head pieces 11 and 21 are clamped together or are joined by an adhesive which is airtight. That is, the atmosphere surrounding the transducers is excluded from the faces. The electrical terminals of the load transducer are connected by lead-in wires to the reactive load including resistance 23 and inductance 24. Much like a motor-generator set, power fed into the test transducer is converted to mechanical energy which, in turn, is reconverted to electrical energy which is absorbed in the load 23–24. From the face and neck velocities read by accelerometers 26 and 27 can be computed the power factor of the mechanical energy fed through the interface.

According to this invention, the transducer assembly is enclosed in the pressure container 30. The cap 31 closes and seals the container, the internal pressure of which is elevated by the air pump 32. The pressure of the container is indicated and/or recorded by pressure gauge 33. In one test setup according to this invention the container 30, cap 31, pump 32 and all fittings were of massive construction to withstand hydrostatic pressures equivalent to more than 6,000 feet of water. Sealing bushings 35, 36 and 37 in the wall of container 30 and bushing 38 in the wall of container 10A are designed to withstand, without rupture, such pressures. The pressure, of course, is variable upward from zero. It is now apparent that if the air under pressure is felt only at the interface of the two transducers, the two faces are pressed together at the pressure of the container, and the pressure environment of the face of the test transducer is effectively simulated. At the same time the air environment within the container is ideal for the test purposes since the air substantially obviate feedback and reverberations within the pressure chamber.

Accordingly, it is possible with the test equipment of this invention to fully evaluate the electrical and mechanical properties of a transducer at any hydrostatic pressure desired without the impracticalities of submergence in water.

If for example the radiation impedance, $Z_r$, of a new transducer is desired. Radiation impedance in mechanical ohms is equal to the force $F_1$ divided by the velocity $V_1$ at the interface 11A of the transducer. Now, the head piece 21 of the test transducer and the steel tube joining the head piece to the piezoelectric generator 20 is a pure mechanical structure which couples the active element of the generator to the mechanical energy to be absorbed. The coupling mechanism preferably is a simple mass and a short stiff steel tube so designed and built that its mechanical impedance looking into either end is easily calculated. Mechanical impedance referred to here is the ratio of one-dimensional force and velocity along the axis of the transducer.

The forces $F_1$ and $F_2$ as well as the velocities $V_1$ and $V_2$ at the two ends 1 and 2 of the coupling mechanism are linearly related and from a matrix equation it can be determined that, $$Z_r = \frac{F_1}{V_1} = Z_{11} + Z_{12} \times \frac{V_2}{V_1}$$

Thus $Z_r$ can be determined from the known constants, $Z_{11}$ and $Z_{12}$, of the coupling mechanism and the measured velocities, $V_2$ and $V_1$, which are read directly from meters 26A and 27A.

Many changes may be made in the test equipment of this invention without departing from the scope of the appended claims. For example, the transducer is not limited to the electro-ceramic shown but may be applied equally well to the electromagnetic or variable reluctance type transducer.

What is claimed is:

1. Apparatus for creating deep-submergence conditions for testing an operating transducer of the type having a head piece and a driving means for reciprocating the radiating face of said head piece and having a housing enclosing the parts of the transducer with only said radiating face exposed, the testing apparatus comprising:

a load transducer capable of generating an output signal which is a function of oscillatory mechanical power applied to the face of said load transducer, the face of said load transducer being adapted for stiff coupling to the face of said operating transducer, a pressure container adapted to receive said load transducer attached face-to-face with said operating transducer, an air pump connected to said container for elevating the air pressure in said container to statically load the face of said operating transducer, and high pressure lead-in seals in the walls of said container for leads to the terminals, respectively, of the two mentioned transducers.

2. The apparatus defined in claim 1 further comprising a signal source connected to the terminals of said operating transducer; and a variable electric load connected to the terminals of said load transducer.

3. The apparatus defined in claim 1 further comprising means for venting the interior of said load transducer to flood the back side of the head piece of said load transducer.

References Cited by the Examiner

UNITED STATES PATENTS

| | | | |
|---|---|---|---|
| 2,574,475 | 11/1951 | Grogan | 73—4 |
| 2,715,331 | 8/1955 | Yates | 73—1 |
| 2,918,651 | 12/1959 | Podolak | 340—8 |
| 2,977,572 | 3/1961 | Pope | 340—10 |
| 3,120,622 | 2/1964 | Dranetz | 310—8.4 |
| 3,121,211 | 2/1964 | Eskin | 340—8 |

CHESTER L. JUSTUS, *Primary Examiner.*

G. M. FISHER, *Assistant Examiner.*